United States Patent [19]

Itoh et al.

[11] Patent Number: 5,240,335
[45] Date of Patent: Aug. 31, 1993

[54] BRAILLE PRINTING APPARATUS

[75] Inventors: Masahiro Itoh, Tokyo; Masayuki Kuwabara, Kanagawa, both of Japan

[73] Assignee: Eastman Kodak Company, Rochester, N.Y.

[21] Appl. No.: 825,484

[22] Filed: Jan. 24, 1992

[30] Foreign Application Priority Data

May 9, 1991 [JP] Japan ................................. 3-104344

[51] Int. Cl.⁵ ............................................... B41J 3/02
[52] U.S. Cl. ..................................... 400/122; 427/145; 118/624
[58] Field of Search ................ 400/120, 122; 101/489, 101/401.1; 118/624; 427/145

[56] References Cited

U.S. PATENT DOCUMENTS

| | | | |
|---|---|---|---|
| 3,608,488 | 9/1971 | Levine | 101/3.1 |
| 3,781,802 | 12/1973 | Kafafian | 434/112 |
| 3,839,028 | 10/1974 | Tamai et al. | 101/463.1 |
| 3,850,627 | 11/1974 | Wells et al. | 430/34 |
| 3,924,019 | 12/1975 | Jacobs | 101/401.1 |
| 3,945,934 | 3/1976 | Jacobs | 430/110 |
| 4,532,865 | 8/1985 | Yoshino | 191/489 |
| 4,650,352 | 3/1987 | Eriksson | 434/113 |
| 4,871,407 | 10/1989 | Honma et al. | 156/83 |
| 4,871,408 | 10/1989 | Honma et al. | 156/219 |
| 4,881,900 | 3/1989 | Matsuoka et al. | 434/113 |

OTHER PUBLICATIONS

"Braille Printed Dot Configuration" IBM Technical Disclosure Bulletin, vol. 20, No. 3, Aug 1977 p. 1204.
"Thermal Printing of Raised Dot Braille-Line Characters for the Vision Impaired" Research Disclosure, Apr. 1991, No. 324 Kenneth Mason Publications, Ltd, England.

*Primary Examiner*—Eugene H. Eickholt
*Attorney, Agent, or Firm*—Raymond L. Owens

[57] ABSTRACT

A braille printing apparatus utilizes non-impact printing technology to provide high-speed, high-volume production of printed braille materials. The document carrying the information to be printed in braille is scanned and read under the control of a computer. The computer outputs the object information in the form of control signals. In accordance with these control signals, a write head projects a beam of light to form a latent image on the charged surface of a rotating drum. Toner is used to develop the image and transfer it to paper, where it is fused. A coarse-grain toner is used, and is applied in a sufficient quantities thereby produce printed braille materials.

7 Claims, 1 Drawing Sheet

BRAILLE PRINTING APPARATUS

BACKGROUND OF THE INVENTION

1. Field of the Invention

The present invention relates to a braille printing apparatus, and more particularly to an apparatus that uses non-impact printing technology to produce printed braille materials.

2. Description of the Prior Art

Braille is printed as a series of raised dots on paper in which each character is represented as a dot pattern in a grid three dots high and two dots wide, forming the basic braille written unit that is read by touch. Special braille writers, braille typewriters and the like are used to write braille. Braille is printed using a zinc printing plate in which character dot impressions are produced and the plate is then pressed onto the paper.

FIG. 3 shows the arrangement of a conventional braille printing system. A computer 1 is used to scan the text and graphic information of a document, the information is subjected to processing, editing and so forth, and a typesetting machine is then used to produce a printing plate 4 from a zinc plate 3. The plate 4 is then pressed onto the surface of the paper 5 to produce the printed braille material 6.

Among the drawbacks of this technique are that it cannot be used to produce large amounts of printed braille materials in a short time, and high-speed, large-scale duplication of the braille materials is also impossible. A further problem is that each time someone wishes to borrow a braille publication from a braille lending library, a new copy of the publication has to be prepared from the original plates or the publication has to be loaned out in the form of a specially-prepared audio recording.

The use of non-impact printing would of course enable such materials to be produced in large quantities and at high speed. However, the drawback with conventional non-impact printing methods has been the low height of the print, rendering it unfeasible for braille applications.

SUMMARY OF THE INVENTION

An object of the present invention is therefore to provide a braille printing apparatus that can utilize non-impact printing for large-scale, high-speed printing of braille materials.

In accordance with the present invention, this object is attained by a braille printing apparatus comprising control means that outputs control signals corresponding to text and graphics information read from a document; image formation means that forms dot images based on control signals from the control means; and transport means for conveying paper to the image formation means; in which the image formation means is comprised of a revolving drum, an electrostatic charge section which applies a prescribed electrostatic charge to the surface of the drum, an exposure section that produces an electrostatic latent image on the drum by projecting light onto the drum surface in accordance with the control signals, a developing section that develops the electrostatic latent image on the drum by the application of toner, and a fusing section that fuses the dot image formed by the transfer of the toner to paper conveyed by the transport means.

The object is also attained by a braille printing apparatus comprising control means that outputs control signals corresponding to text and graphics information read from a document; image formation means that forms dot images based on control signals from the control means; and transport means for conveying paper to the image formation means; in which the image formation means is comprised of a revolving drum, an ink film provided with an ink layer of a prescribed thickness and arranged in opposition to the drum, and a heating element that operates in accordance with control signals to generate Joule heat to melt the ink of the ink film and produce a dot image on the paper conveyed between the drum and the ink film by the transport means.

Thus, in accordance with an arrangement of a first embodiment, braille printing is effected by the innovative use of non-impact printing in the form of electrophotographic technology. That is, an electrostatic charge is distributed across the surface of the drum, a beam of light is used to produce a latent image on the drum, and toner is then induced to adhere to the image for transfer to the paper. The strength of the electrostatic charge applied to the drum is adjusted to adjust the amount of toner that adheres to the image to ensure that the amount of toner transferred to the paper is thick enough for braille applications.

In a second embodiment, the braille printing is effected by the innovative use of non-impact thermal printing technology. In this case, in ink film is used, and a heating element is used to melt the ink onto the paper, with the requisite thickness for braille applications being obtained by adjusting the thickness of the layer of ink on the ink film.

Further features of the invention, its nature and various advantages will become more apparent from the accompanying drawings and following detailed description of the invention.

DESCRIPTION OF THE PREFERRED EMBODIMENT

Figure 1:
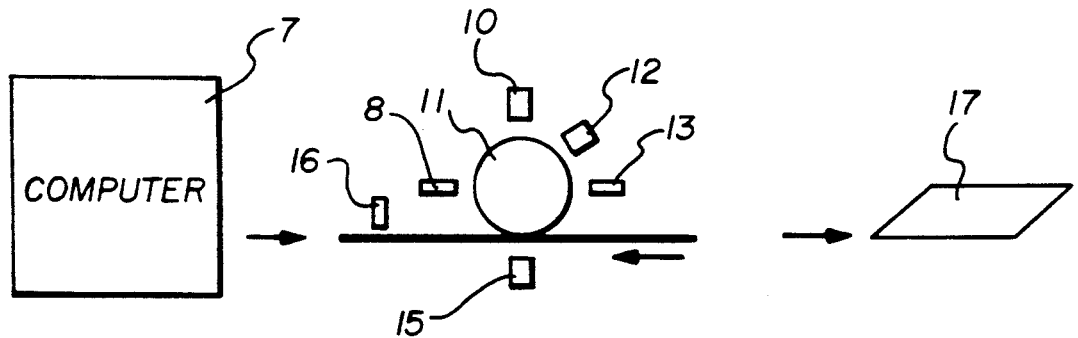
FIG. 1 shows the general arrangement of the braille printing apparatus according to a first embodiment of the present invention.

FIG. 1 shows the main structural elements of a first embodiment of the braille printing apparatus of the present invention. Text and graphics information on a document is read into a computer 7 constituting the system control means, and the computer 7 outputs control signals corresponding to this information. For this, the computer 7 is provided with an image scanning section, such as a CCD (charge-coupled device) sensor, a CPU (central processing unit) for processing signals from the image scanning section, and a memory in which to store the processed information.

Control signals output by the computer 7 go to the image formation section of a braille printing apparatus that employs electrophotographic non-impact printing technology to perform the printing. The image formation section is provided with a drum 11 that rotates at a prescribed speed. An electrostatic charge section 10 distributes a positive electrical charge across the surface of the drum 11, and the charged surface of the drum 11 is then brought under a write head 12. The write head 12 projects onto the surface of the drum 11 a beam of light that is modulated in accordance with control signals received from the computer 7. As the charge on the surface of the drum 11 is removed by this beam of light, an electrostatic latent image is thus formed.

A developing section 13 then develops the latent image on the drum 11 by the adhesion of negatively-charged colored particles to the latent image. Development conditions can be adjusted by suitably varying particle coloring, additives and the like. For the purpose of this embodiment, the image is developed by applying toner that is constituted of larger particles than the toner used in ordinary optical printers and has the prescribed negative charge.

With the rotation of the drum 11, the image thus developed is brought to an image transfer section 15 to which paper 14 is brought by a transport means (not shown). The transport means may be the same type as that used in conventional copying machines or the like. The image transfer section 15 uses a corona discharge to apply a positive charge to the reverse side of the paper 14, that is, to the side facing the image transfer section 15, causing the toner adhering to the drum 11 to be transferred to the surface of the paper 14.

In accordance with this embodiment, the electrostatic charge section 10 applies an electrostatic charge of a prescribed strength to the surface of the drum 11 and the toner supplied by the developing section 13 has a larger particle size than ordinary toner, resulting in the transfer of adequate amounts of toner to the paper 14. The transport means then conveys the paper 14, to which the toner has thus been applied, to a fusing unit 16. At the fusing unit 16 the toner forming the image is fused onto the paper 14 by feeding the paper 14 between a pair of rollers and applying a prescribed degree of heat, thereby producing the required printed braille material 17. To provide sufficient height differentiation between toner and non-toner surface portions of the paper, the rollers are set to operate at a lower pressure than that normally used to fuse the toner. Following this, a discharge element 8 removes the positive charge from the drum 11 and the drum 11 is cleaned to prepare it for the next sequence of printing operations that starts from the electrostatic charge section 10. In this way, non-impact printing technology can be used for high-speed, high-volume production of printed braille materials.

Figure 2:
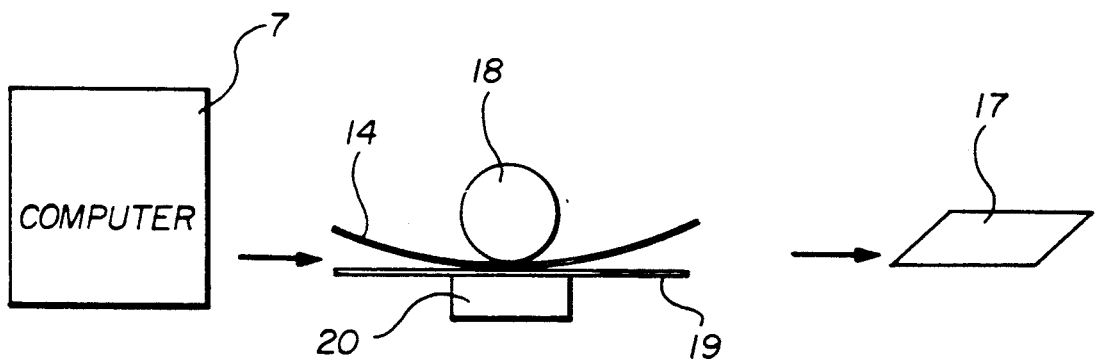
FIG. 2 shows the general arrangement of the braille printing apparatus according to a second embodiment of the invention.
Figure 3:
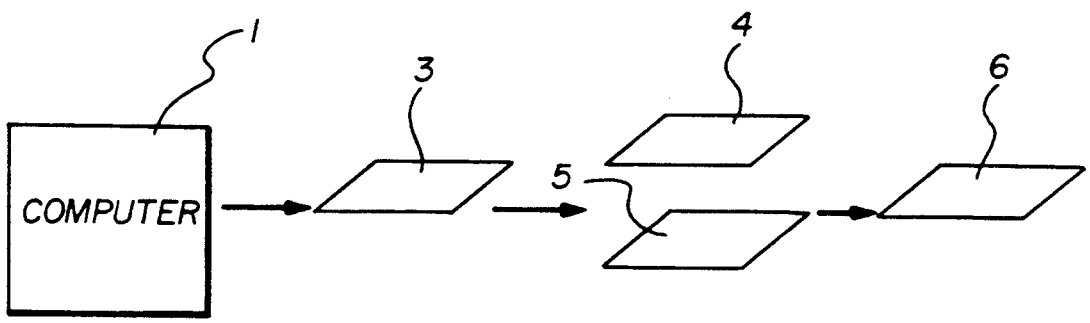
FIG. 3 illustrates a conventional method of producing braille printing.

FIG. 2 shows the configuration of a braille printing apparatus according to a second embodiment of the invention. This embodiment uses a thermal transfer printing system instead of the electrophotographic system of the first embodiment.

As in the first embodiment, a system control means in the form of a computer 7 is used to read in information on a document, and the document's textual and graphics information is edited and output as control signals. These control signals are sent to the image formation section of a braille printing apparatus. The image formation means is provided with a drum 18 that rotates at a prescribed speed. An ink film 19 is arranged in opposition to the drum 18. In this embodiment, the ink film 19 has a thick layer of ink, i.e. several hundred micrometers thick, and the braille dots are formed by fusing this ink onto the paper 14.

More specifically, the computer 7 sends control signals to a heating element 20 provided near the drum 18, causing the heating element 20 to generate Joule heat in accordance with the control signals. This heat causes the ink on the ink film 19 to melt onto the surface of the paper 14. The ink from the ink film 19 is provided in an amount that is sufficient to produce a differentiation in height between inked and non-inked surface portions of the paper so as to thereby produce the printed braille material 17. In this way, non-impact printing technology can be used for high-speed, high-volume production of printed braille materials.

The braille printing apparatus according to the above embodiments of the present invention can also be incorporated in facsimile equipment, thereby enabling text transmitted over telephone lines to be edited and converted to printed braille.

The invention has been described in detail with particular reference to certain preferred embodiments thereof, but it will be understood that variations and modifications can be effected within the spirit and scope of the invention.

What is claimed is:

1. A braille printing apparatus comprising:
   control means for outputting control signals corresponding to text and graphics information read from a document;
   image formation means for forming braille pattern dot images based on control signals from the control means;
   transport means for conveying a recording medium to the image formation means;
   the image formation means being comprised of a revolving drum; and electrostatic charge section which applies a prescribed electrostatic charge to the surface of the drum; an exposure section that produces an electrostatic latent image on the drum by projecting light onto the drum surface in accordance with the control signals; a developing section that develops the electrostatic latent image on the drum by the application of toner; and a fusing section that includes rollers which are set to operate a at a lower pressure than that used to fuse toner in ordinary photocopying operations to fuse the dot images formed by the transfer of the toner to the recording medium conveyed by the transport means; and
   the prescribed electrostatic charge being sufficient to ensure that the dot images have a thickness adequate to be read by touch in braille applications.

2. The apparatus of claim 1 wherein the toner is comprises of particles the size of which is larger than the particle size of toner used in ordinary photocopying operations.

3. The apparatus of claim 1 wherein the toner has a prescribed negative charge.

4. A braille printing apparatus comprising:
   control means for outputting control signals corresponding to text and graphics information read from a document;
   image formation means for forming braille pattern dot images based on control signals from the control means;
   transport means for conveying paper to the image formation means; and
   the image formation means being comprised of a revolving drum; an electrtostatic section which applied a prescribed electrostatic charge to the surface of the drum; an exposure section that produces an electrostatic latent image on the drum by projecting light onto the drum surface in accordance with the control signals; a developing section that develops the electrostatic latent image on the drum by the application of a toner comprised of particles the size of which is larger than the particle size of toner used in ordinary photocopying operations; and a fusing section that includes rollers which are set to operate at a lower pressure than that used to fuse toner in ordinary photocopying operations to fuse the dot images formed by the transfer of the toner to the paper conveyed by the transport means; the size of the toner particles being selected to provide dot images with a thickness adequate for braille applications.

5. The apparatus of claim 4 wherein the toner has a prescribed negative charge.

6. A braille printing apparatus comprising:
control means for outputting control signals corresponding to text and graphics information read from a document;
image formation means for forming braille pattern dot images based on control signals from the control means;
transport means for conveying paper to the image formation means; and
the image formation means being comprised of a revolving drum; an electrostatic section which applies a prescribed electrostatic charge to the surface of the drum; an exposure section that produces an electrostatic latent image on the drum by projecting light onto the drum surface in accordance with the control signals; a developing section that develops the electrostatic latent image on the drum by the application of a toner comprises of particles the size of which is larger than the particle size of toner used in ordinary photocopying operations and which toner has a prescribed negative charge; and a fusing section that fuses the dot images formed by the transfer to toner to the paper conveyed by the transport means, said fusing section being comprised of rollers which are set to operate a lower pressure than that used to fuse toner in ordinary photocopying operations; the size of said toner particles and the pressure applied by said rollers being selected to produce dot images with a thickness adequate for braille applications.

7. A braille printing apparatus comprising:
control means for generating control signals corresponding at least to text information read from a document;
image formation means for transferring a toner with a prescribed electrostatic charge and having particles the size of which is larger than the size of toner particles used in ordinary photocopying operations to a recording medium in accordance with said control signals to form braille pattern dot images on said recording medium; and
the prescribed electrostatic charge and the size of said toner particles are selected to produce dot images with a thickness adequate to be read by touch in braille applications.

* * * * *